Figure 1:
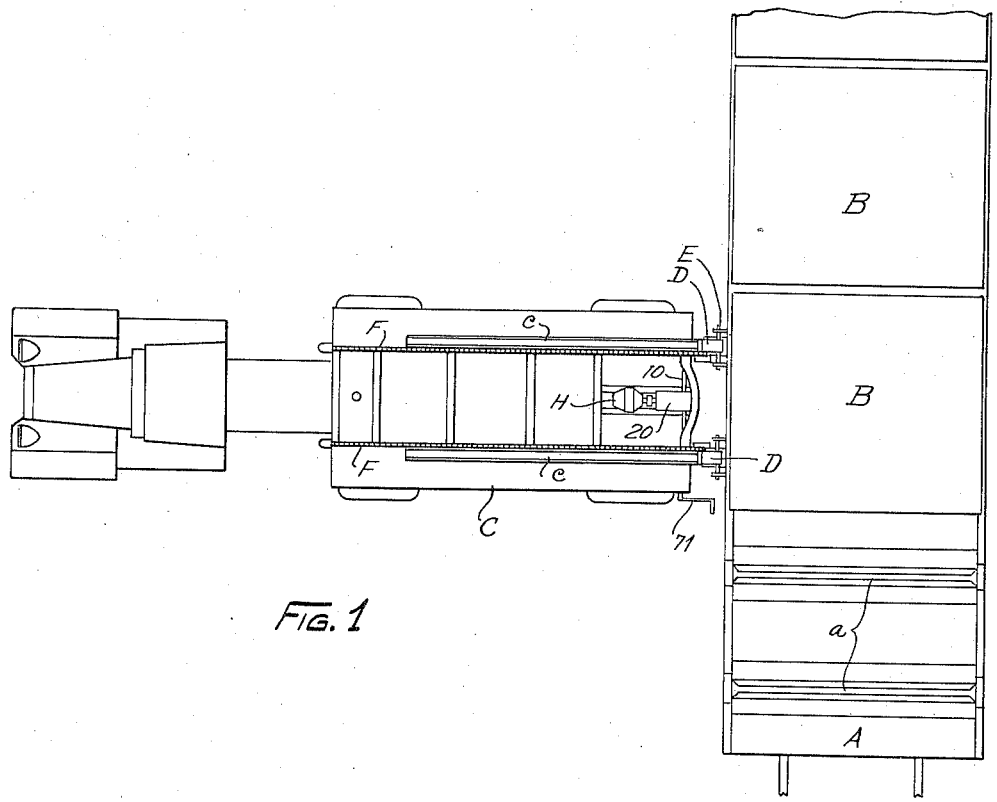

Aug. 16, 1938.          R. A. NORBOM              2,126,801
       APPARATUS FOR TRANSFERRING DEMOUNTABLE BODIES
               Filed June 29, 1936        3 Sheets-Sheet 1

INVENTOR.
Ragnar A. Norbom,
BY Bates, Goldrick & Teare
                    ATTORNEYS.

Aug. 16, 1938.   R. A. NORBOM   2,126,801
APPARATUS FOR TRANSFERRING DEMOUNTABLE BODIES
Filed June 29, 1936   3 Sheets-Sheet 3

INVENTOR.
Ragnar A. Norbom,
BY
ATTORNEYS.

Patented Aug. 16, 1938

2,126,801

UNITED STATES PATENT OFFICE 2,126,801

APPARATUS FOR TRANSFERRING DEMOUNTABLE BODIES

Ragnar A. Norbom, Clifton, N. J., assignor to Motor Terminals Company, New York, N. Y., a corporation of Delaware Application June 29, 1936, Serial No. 87,936

2 Claims. (Cl. 214—38)

This invention relates to an apparatus for handling demountable freight containers by means of a railway car and a highway truck equipped with mechanism for moving the container from one vehicle to the other. More particularly the invention is concerned with a highway truck having power mechanism, energized by the engine of the truck or from a separate source, which operates propelling mechanism on the truck to shift the demountable body. The truck may comprise a trailer member having parallel guideways for the body, endless chains having reaches extending along the guideways adapted to be attached to the body, and an electric motor on the trailer which, through reduction gearing, operates sprocket wheels about which the chains loop.

An object of the invention is to provide a simple and an efficient emergency mechanism for the manual operation of the body propelling mechanism on the truck in case the normal power should fail for any reason.

To illustrate the importance of such emergency mechanism, it may be noted for instance that one of the uses of the transportation apparatus is the handling of tank bodies containing milk. In normal operation, such bodies after delivery of milk during the day time are returned some time between 8 and 12 p. m. and then it is necessary without delay to transfer the body to a pasteurizing plant for emptying, washing, sterilizing and the return of the tank in time for filling and mounting on the outgoing cars, which are likely to depart from 2 to 6 a. m. To carry out this schedule it is very important that there be no possible failure during the midnight hours, when it is difficult to secure service and when a short interruption of the schedule would prevent the loaded tanks leaving in the morning hours and disrupt the whole day's delivery. Likewise in transportation of fruits or other perishable goods, it is very important that delays be eliminated.

To enable the emergency manual operation in a very simple manner whenever necessary, I provide a truck with propelling mechanism operated by powerful reduction gearing which is not self-locking, and I furnish a removable crank of peculiar form, which when put in place, may mesh directly with one of the gears in the transmission mechanism of the body propulsion system and serve to operate it. The bodies are very heavy and are skidded from the truck to the railway car and vice versa, so that much force is required to move them. To effect this movement manually, I have so devised the cranking arrangement that it may engage a gear of the reduction train well in advance of the ultimate delivery of power, so that successive rotations of the crank even at the expense of considerable manual effort and a slower operation than the motor driven system, may effectively shift the body loaded or empty to or from the truck.

This invention is illustrated in the drawings thereof and is more fully hereinafter explained and its essential novel features are summarized in the claims.

Figure 2:
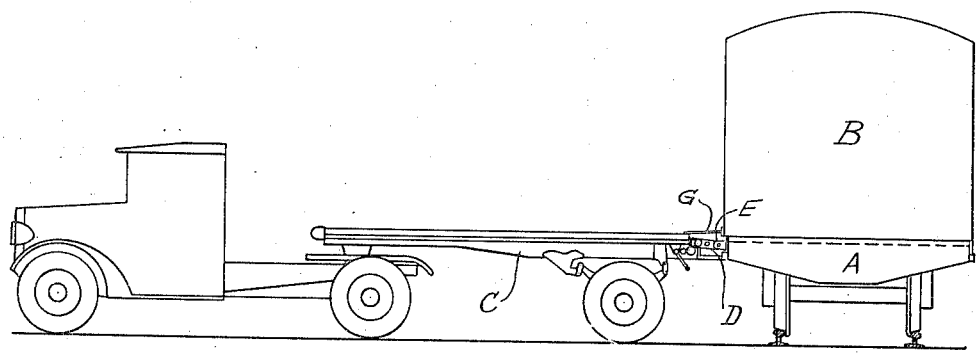
Figure 3:
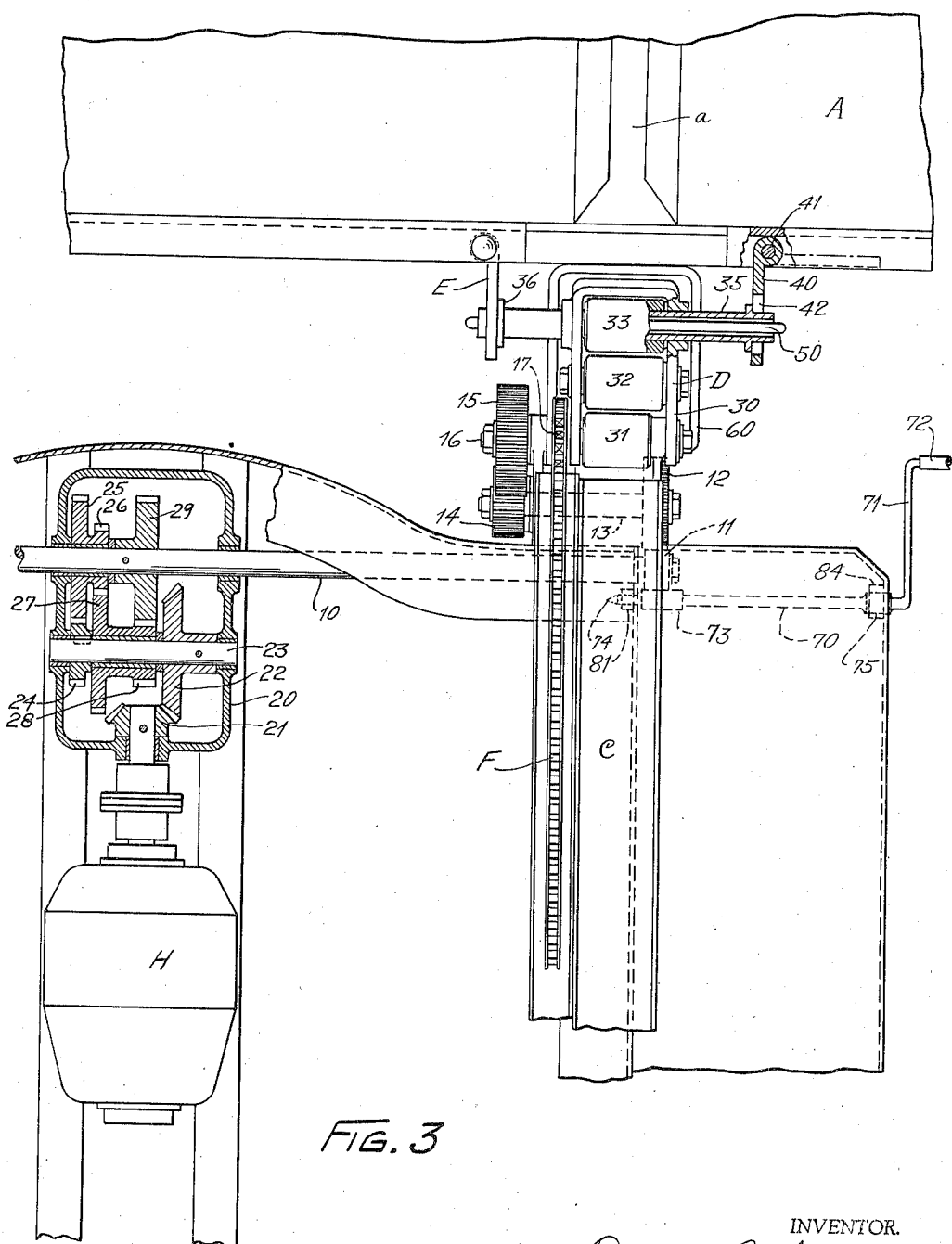
Figure 4:
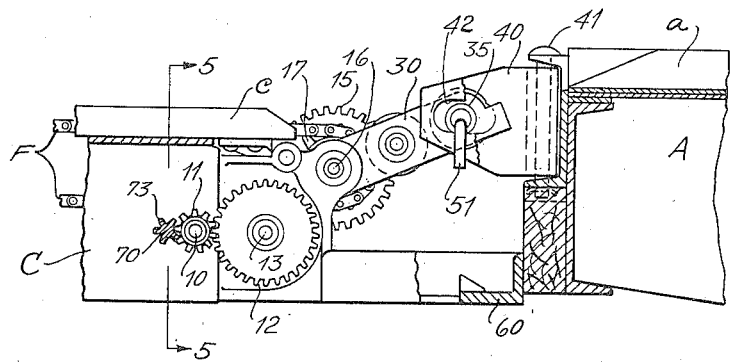
Figure 5:
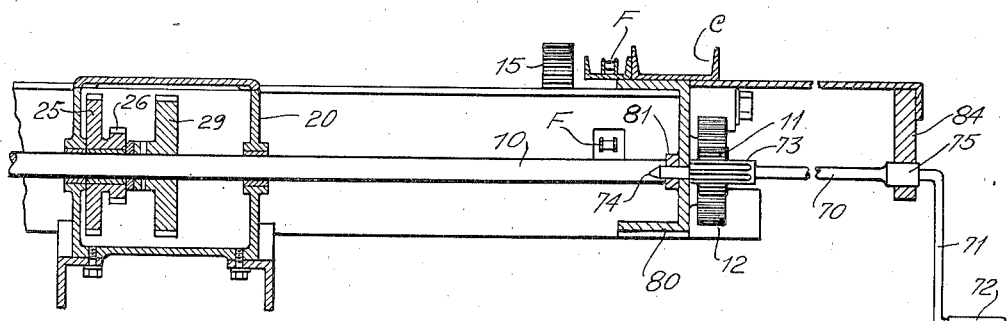

In the drawings, Fig. 1 is a plan of a demountable body transporting apparatus comprising a railway flat car and a highway truck adapted to be connected to the side of the car, the truck having motor-operated propelling mechanism arranged to move the body. Fig. 2 is a side elevation of the parts shown in Fig. 1. Fig. 3 is a plan on a larger scale of the rear portion of the truck and the adjacent portion of the railway car to which the truck is attached. Fig. 4 is a fragmentary side elevation of the rear portion of such attached truck and adjacent the portion of the railway car. Fig. 5 is a fragmentary cross-section through the truck along the axis of the emergency crank, as indicated by the line 5—5 in Fig. 4.

In Figs. 1 and 2, A indicates a railway car equipped with body-guiding channels $a$; B indicates the demountable bodies or tanks which may be mounted on the flat car and carry on their underside parallel skid rails adapted to occupy the channels $a$. The highway truck C is shown of the tractor-trailer type and has longitudinal channels $c$ adapted to register with the channels $a$ on the car.

At its rear end, the truck carries bridges D which register with the channels $c$ and are adapted to be attached to the car by suitable connecting devices E at the car side. The truck has endless propelling chains F, the upper reaches of which extend parallel to the truck channels. Push-and-pull bars G are adapted to connect the body to the upper regions of the chains which are normally pulled in one direction or the other by a motor H operating through suitable reduction gearing, shafts, etc. as hereafter described. The result is that in normal operation, the motor may shift the body, even when heavily loaded, from the truck to the car or vice versa, in a very short time.

As illustrated in Fig. 3, the motor H is connected through reduction gearing of the non-locking type with a transverse shaft 10 which carries on its ends pinions one of which is shown at 11 and which meshes with a spur gear 12 on a shaft 13 which carries a spur pinion 14 meshing with a gear 15 on a shaft 16. On this shaft is a sprocket wheel 17 about which the propelling chain F loops. It is to be understood that the construction shown in Fig. 3 is duplicated on the other side of the truck, so that when the motor operates the shaft 10, the two chains are progressed in one direction or the other according to the direction of rotation of the motor.

The reduction gearing from the motor to the shaft 10 may be varied from that shown but should be of the non-locking type so that the shaft 10 may turn the motor in emergency operation as hereafter explained. As shown in Fig. 3, the armature shaft of the motor extends into a suitable gear housing 20 and carries a bevel pinion 21 meshing with a bevel gear 22 fixed on a rotatable shaft 23. On this shaft is the spur pinion 24, meshing with a gear 25. This gear is rigid with a pinion 26 which meshes with a gear 27 loose on the shaft 23. Rigid with the gear 27 is a pinion 28 which meshes with a gear 29 rigid on the shaft 10.

Pivoted on the shafts 16 carrying the chain and sprocket wheel 17 are bails 30 each carrying rollers 31, 32 and 33. The roller 31 may be mounted concentrically of the shaft 16. These bails 30 with their freely rotating rollers constitute the bridges designated D mentioned in connection with Fig. 1.

The shaft 35 of the roller 33 preferably extends in each direction from the bail 30 to provide means for attachment to the railway car. As shown in Figs. 3 and 4, the car is provided with wings 40 pivoted on vertical pins 41 and adapted to be moved outwardly at right angles to the car side as shown in Figs. 3 and 4 and in this position receive the extreme ends of the shaft 35 in the horizontal slots 42 in the wings. Collars 36 on the shaft prevent the inward movement of the wings, while a rod 50 mounted loosely in a bore in the shaft 35 has downturned ends 51 (Fig. 4) which after being passed through the slots 42 serve to prevent withdrawal of the wings.

The construction of wings 40 and associated parts just described constitute the attaching device E at the car side heretofore mentioned. Such construction, however, is no part of my invention but is claimed in a pending application of Benjamin F. Fitch No. 3,213, filed July 18, 1935.

The truck is shown herein as equipped with a pair of bumpers 60, one beneath each bridge, to engage the side of the car as the truck backs into place and thereby locate the bridges with reference to the attaching devices. These bumpers also serve to support the free ends of the bridges in the normal travel of the truck and protect them from injury. The specific bridge and bumper mechanism, however, are not claimed in this application, but in a copending application of mine.

It will be seen that a truck having provision for the container support and having the propelling mechanism described may readily operate by a comparatively small amount of electric power supplied to the motor H to skid a heavily loaded body from the truck to the railway car or vice versa. In this transfer the skid rails on the bottom of the body pass out of the channels of one vehicle across the rollers of the bridge and into the channels of the other vehicle. The current may be supplied by a generator (not shown) on the tractor unit of the combination truck, or current may be supplied to the motor from an outside source.

In case the electric current for any reason fails my emergency crank may be brought into place for manual operation. This crank is illustrated in Figs. 3 and 5 and consists of a shaft 70 having a crank arm 71 and a handle 72, a comparatively wide pinion 73 of few teeth on the shaft near some back distance from the extreme end, leaving a projection on the shaft or pilot beyond the pinion illustrated at 74. On the shaft 70 adjacent the crank arm is a cylindrical enlargement or boss 75 of a diameter slightly greater than that of the pinion 73.

The truck has longitudinal sills 80 beneath the channels c which receive the body skid rails. In the web of one of these sills, just back of the pinion 11, I make a circular opening, and on the inner face of the web I provide a reinforcing boss 81 with a registering opening. In alignment with these openings I provide a larger cylindrical opening through a vertical skirt member 84 depending from the outer edge of the truck. The openings through the sill web, the reinforcing boss and through the skirt member are adapted to receive the pilot and boss of the crank as illustrated in Fig. 5.

In use the crank is normally retained in the cab of the tractor. If, however, there is any occasion to use it, it is only necessary to shove it in manually through the opening in the skirt member 84, passing the pilot into the openings in the web and reinforcing boss, whereupon the crank teeth 73 thus automatically slide into engagement with the pinion 11 of the gear train. The manual power applied to the crank handle 72 will operate the chains 73 in one direction or the other according to the direction of the rotation of the crank, the motor armature spinning idly during this operation. This serves to propel the body so that in a few minutes, it may be transferred from the truck to the car or vice versa.

I claim:

1. In the art of freight transferring systems of the class described, wherein a motor-driven gear mechanism is employed for normally moving a demountable body from a truck to a railway car or vice-versa, the combination of a removable crank having a shaft with a pinion both removable with the crank and a pilot beyond the pinion, and crank receiving bearings carried by the truck to receive said pilot, whereby when said crank is put in place its pinion will mesh with and drive the gear mechanism, which is normally driven by said motor, so that the body can be manually moved from said truck to said car or vice-versa.

2. In the art of freight transferring systems of the class described, wherein a motor-driven gear mechanism is employed for normally moving a demountable body from a truck to a railway car or vice-versa, the combination of a removable crank having a shaft with a circular enlargement adjacent the crank arm and a pinion adjacent the free end, there being a pilot beyond the pinion, and crank receiving bearings carried by the truck to receive said enlargement and pilot respectively, whereby when said crank is inserted within said bearings its pinion will mesh with and drive the gear mechanism, which is normally driven by said motor, so that the body can be manually moved from said truck to said car or vice-versa.

RAGNAR A. NORBOM.